(12) United States Patent
Suzuki

(10) Patent No.: US 7,912,992 B2
(45) Date of Patent: Mar. 22, 2011

(54) DISK-DRIVE AUTOMATIC RECOGNITION/SETTING APPARATUS AND DISK-DRIVE AUTOMATIC RECOGNITION/SETTING METHOD

(75) Inventor: Tomonori Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/955,816

(22) Filed: Dec. 13, 2007

(65) Prior Publication Data
US 2008/0195766 A1 Aug. 14, 2008

(30) Foreign Application Priority Data
Feb. 9, 2007 (JP) ................................. 2007-030338

(51) Int. Cl.
G06F 3/00 (2006.01)
G06F 13/00 (2006.01)

(52) U.S. Cl. .................. 710/10; 710/2; 710/8; 710/104; 710/300

(58) Field of Classification Search ...................... 710/36
See application file for complete search history.

(56) References Cited

U.S. PATENT DOCUMENTS

| | | | |
|---|---|---|---|
| 4,979,107 A | | 12/1990 | Advani et al. |
| 6,137,781 A * | | 10/2000 | Goto et al. ................ 370/255 |
| 7,028,106 B2 * | | 4/2006 | Foster et al. ................ 710/2 |
| 7,035,952 B2 * | | 4/2006 | Elliott et al. ................ 710/300 |
| 7,228,364 B2 | | 6/2007 | Ramsey et al. |
| 7,401,171 B2 * | | 7/2008 | Slutz et al. ................ 710/104 |
| 2003/0172140 A1 | | 9/2003 | Nishi |
| 2003/0184902 A1 * | | 10/2003 | Thiesfeld ................ 360/48 |
| 2003/0208589 A1 | | 11/2003 | Yamamoto |
| 2005/0080881 A1 * | | 4/2005 | Voorhees et al. ................ 709/220 |
| 2006/0155928 A1 * | | 7/2006 | Mimatsu ................ 711/112 |
| 2006/0184703 A1 | | 8/2006 | Shibata |
| 2007/0073909 A1 * | | 3/2007 | Gasser ................ 710/8 |
| 2007/0220204 A1 * | | 9/2007 | Nakajima et al. ................ 711/114 |
| 2008/0010530 A1 * | | 1/2008 | Davies et al. ................ 714/31 |

FOREIGN PATENT DOCUMENTS

| | | |
|---|---|---|
| JP | 61-194556 | 8/1986 |
| JP | 10-40208 | 2/1998 |
| JP | 10-303899 | 11/1998 |
| JP | 2000-010904 | 1/2000 |
| JP | 2001-350674 | 12/2001 |

(Continued)

OTHER PUBLICATIONS

Rob Elliott, "Serial Attached SCSI Management upper layers and port layer", Sep. 30, 2003, Hewlett-Packard Corporation, pp. 1-62.*

(Continued)

*Primary Examiner* — Tariq Hafiz
*Assistant Examiner* — Dayton Lewis-Taylor
(74) *Attorney, Agent, or Firm* — Staas & Halsey LLP

(57) ABSTRACT

According to an aspect of an embodiment, a disk-drive automatic recognition/setting apparatus for a disk system including a controller, a disk drive, and an expander attached to the controller, the disk drive, or another expander, provides an information obtaining requesting unit issuing a request for obtaining information regarding a device attached to each attachment port of the expander, an information obtaining unit obtaining the information requested, and a routing reset request transmitting unit determining based upon the information obtained, whether a routing method of the attachment port is correctly set, and, if the routing method is wrong, transmitting a reset request for correctly resetting the wrong routing method.

16 Claims, 5 Drawing Sheets

FOREIGN PATENT DOCUMENTS

| | | |
|---|---|---|
| JP | 2003-263349 | 9/2003 |
| JP | 2005-94057 | 4/2005 |
| JP | 2006-12131 | 1/2006 |

OTHER PUBLICATIONS

Qin Xin; Miller, E.L.; Schwarz, S.J.T.J.E.; , "Evaluation of distributed recovery in large-scale storage systems," High performance Distributed Computing, 2004. Proceedings. 13th IEEE International Symposium on , vol., No., pp. 172-181, Jun. 4-6, 2004 URL: http://ieeexplore.ieee.org/stamp/stamp.jsp?tp=&arnumber=132352.*

American National Standards Institute, Inc., "Serial Attached SCSI, T10/1601-D Revision 10", Copyright 2005 by Information Techonology Industry Council (ITI), pp. 1-624.*

Japanese Office Action dated Feb. 3, 2009 in corresponding Japanese Application No. 2007-030338 (2 pages) (2 pages English Translation—p1, L19-p2, L24).

* cited by examiner

FIG. 2

| BYTE\BIT | 7 | 6 | 5 | 4 | 3 | 2 | 1 | 0 |
|---|---|---|---|---|---|---|---|---|
| 0 | colspan=8 | SMP FRAME TYPE (41H) | | | | | | |
| 1 | colspan=8 | FUNCTION (10H) | | | | | | |
| 2 | colspan=8 | FUNCTION RESULT | | | | | | |
| 3 | colspan=8 | RESERVED | | | | | | |
| 8 | | | | | | | | |
| 9 | colspan=8 | PHY IDENTIFIER | | | | | | |
| 10 | colspan=8 | RESERVED | | | | | | |
| 11 | | | | | | | | |
| 12 | RESERVED | colspan=3 | ATTACHED DEVICE TYPE | | | colspan=4 | RESERVED | | | |
| 13 | colspan=4 | RESERVED | | | | colspan=4 | NEGOTIATED PHYSICAL LINK RATE | | | |
| 14 | colspan=4 | RESERVED | | | | ATTACHED SSP INITIATOR | ATTACHED STP INITIATOR | ATTACHED SMP INITIATOR | ATTACHED SATA HOST |
| 15 | ATTACHED SATA PORT SELECTOR | colspan=3 | RESERVED | | | | ATTACHED SSP TARGET | ATTACHED STP TARGET | ATTACHED SMP TARGET | ATTACHED SATA DEVICE |
| 16 | colspan=8 | SAS ADDRESS | | | | | | |
| 23 | | | | | | | | |
| 24 | colspan=8 | ATTACHED SAS ADDRESS | | | | | | |
| 31 | | | | | | | | |
| 32 | colspan=8 | ATTACHED PHY ADDRESS | | | | | | |
| 33 | colspan=8 | RESERVED | | | | | | |
| 39 | | | | | | | | |
| 40 | colspan=4 | PROGRAMMED MINIMUM PHYSICAL LINK RATE | | | | colspan=4 | HARDWARE MINIMUM PHYSICAL LINK RATE | | | |
| 41 | colspan=4 | PROGRAMMED MAXIMUM PHYSICAL LINK RATE | | | | colspan=4 | HARDWARE MAXIMUM PHYSICAL LINK RATE | | | |
| 42 | colspan=8 | PHY CHANGE COUNT | | | | | | |
| 43 | VIRTUAL PHY | colspan=3 | RESERVED | | | | colspan=4 | PARTIAL PATHWAY TIMEOUT VALUE | | | |
| 44 | colspan=4 | RESERVED | | | | colspan=4 | ROUTING ATTRIBUTE | | | |
| 45 | RESERVED | colspan=7 | CONNECTOR TYPE | | | | | | |
| 46 | colspan=8 | CONNECTOR ELEMENT INDEX | | | | | | |
| 47 | colspan=8 | CONNECTOR PHYSICAL LINK | | | | | | |
| 48 | colspan=8 | RESERVED | | | | | | |
| 49 | | | | | | | | |
| 50 | colspan=8 | VENDOR SPECIFIC | | | | | | |
| 51 | | | | | | | | |
| 52 | (MSB) | colspan=7 | CRC | | | | | | |
| 55 | | | | | | | | (LSB) |

FIG. 4

| BYTE\BIT | 7 | 6 | 5 | 4 | 3 | 2 | 1 | 0 |
|---|---|---|---|---|---|---|---|---|
| 0 | SMP FRAME TYPE (40H) ||||||||
| 1 | FUNCTION (91H) ||||||||
| 2 | RESERVED ||||||||
| 8 | | | | | | | | |
| 9 | PHY IDENTIFIER ||||||||
| 10 | PHY OPERATION ||||||||
| 11 | colspan="7" RESERVED | UPDATE PARTIAL PATHWAY TIMEOUT VALUE |
| 12 | RESERVED ||||||||
| 31 | | | | | | | | |
| 32 | PROGRAMMED MINIMUM PHYSICAL LINK RATE |||| RESERVED ||||
| 33 | PROGRAMMED MAXIMUM PHYSICAL LINK RATE |||| RESERVED ||||
| 34 | RESERVED ||||||||
| 35 | | | | | | | | |
| 36 | RESERVED |||| PARTIAL PATHWAY TIMEOUT VALUE ||||
| 37 | RESERVED ||||||||
| 39 | | | | | | | | |
| 40 | (MSB) | CRC |||||| |
| 43 | | | | | | | | (LSB) |

DISK-DRIVE AUTOMATIC RECOGNITION/SETTING APPARATUS AND DISK-DRIVE AUTOMATIC RECOGNITION/SETTING METHOD

CROSS-REFERENCE TO RELATED APPLICATIONS

This application is related to and claims priority to Japanese patent application no. 2007-30338 filed on Feb. 9, 2007 in the Japan Patent Office, and incorporated by reference herein.

BACKGROUND

1. Field

The embodiments relate to disk-drive automatic recognition/setting apparatus and methods.

2. Description of the Related Art

FIG. 5 illustrates the related art.

A redundant array of independent (or inexpensive) disks (RAID) system including a plurality of hard disk drives (HDDs) with a serial attached small computer system interface (serial attached SCSI or SAS) interface generally uses expander devices for attaching the HDDs. As shown in FIG. 5, expanders are located between controllers (CM0 and CM1) for controlling the RAID system and disk enclosures (DE00, DE01, and DE02) including HDDs. Expanders are used to set expanded DEs.

In a SAS environment, controllers (CMs), expanders, and HDDs form one port by attaching transmission/reception ports referred to as phys, thereby attaching the devices. This must be done by taking into consideration the setting of a routing method of each expander. There are three routing methods that can be used in expanders: direct routing, table routing, and subtractive routing. The routing method can be set for each expander phy. Direct routing is an access method for directly accessing an attached device (one-to-one attachment) according to a specified SAS address. Table routing is an access method in which SAS addresses of devices attached to an expander are stored as a plurality of tables, and, in response to a request for accessing the devices which is given by specifying the SAS addresses, reference is made to the tables, and access data and the like are distributed among the devices indicated by the SAS addresses. Subtractive routing is an access method in which, if an access-requested SAS address is not included in a routing table, its access data is transferred to a port attached to another expander. The Serial Attached SCSI-1.1 (SAS-1.1) Revision 10 defined by the American National Standards institute (ANSI) describes on page 48 that, as in expanders 10, 11, 20, and 21 shown in FIG. 5, an expander attached at host side to another expander uses subtractive routing at host side and uses table routing at the opposite side.

Referring to FIG. 5, a port containing phys 00 to 03, a port containing phys 08 to 0n, and a port containing phys 04 to 07 of an expander 00 are each represented as "T", which indicates that the ports are routed by table routing. A port containing phys 00 to 03 of an expander 10 is represented as "S", which indicates that the port is routed by subtractive routing. A port containing phys 08 to 0n and a port containing phys 04 to 07 of the expander 10 are represented as "T", which indicates that the ports are routed by table routing. The similar description applies to other portions.

SUMMARY

According to an aspect of an embodiment, a disk-drive automatic recognition/setting apparatus for a disk system including a controller, a disk drive, and an expander attached to the controller, the disk drive, or another expander, has an information obtaining requesting unit configured to issue a request for obtaining information regarding a device attached to each attachment port of the expander, an information obtaining unit configured to obtain the information requested, and a reset request transmitting unit configured to determine, on the basis of the information obtained, whether a routing method of the attachment port is correctly set, and, if the routing method is wrong, to transmit a reset request for correctly resetting the wrong routing method.

According to an aspect of an embodiment, a disk system including disk drives and one or more expanders attaching the disk drives, includes a controller discovering information regarding a device attached to each attachment port of each expander, detecting an error in a routing method of an attachment port of an expander, based upon the discovered device information for the expander, and according to the error detecting, resetting the routing method of the attachment port of the expander by transmitting to the expander a routing method reset command correctly setting the routing method of the attachment port of the expander.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 illustrates the format of a discover response frame, according to an embodiment;

FIG. 4 illustrates the format of a phy control frame, according to an embodiment;

DETAILED DESCRIPTION OF THE PREFERRED EMBODIMENTS

According to an embodiment, there is provided a scheme in which, when power of a RAID system is turned on, the routing setting of each expander phy is checked, and, if an error is detected in the routing setting, the setting is automatically changed by a controller CM.

Figure 1:
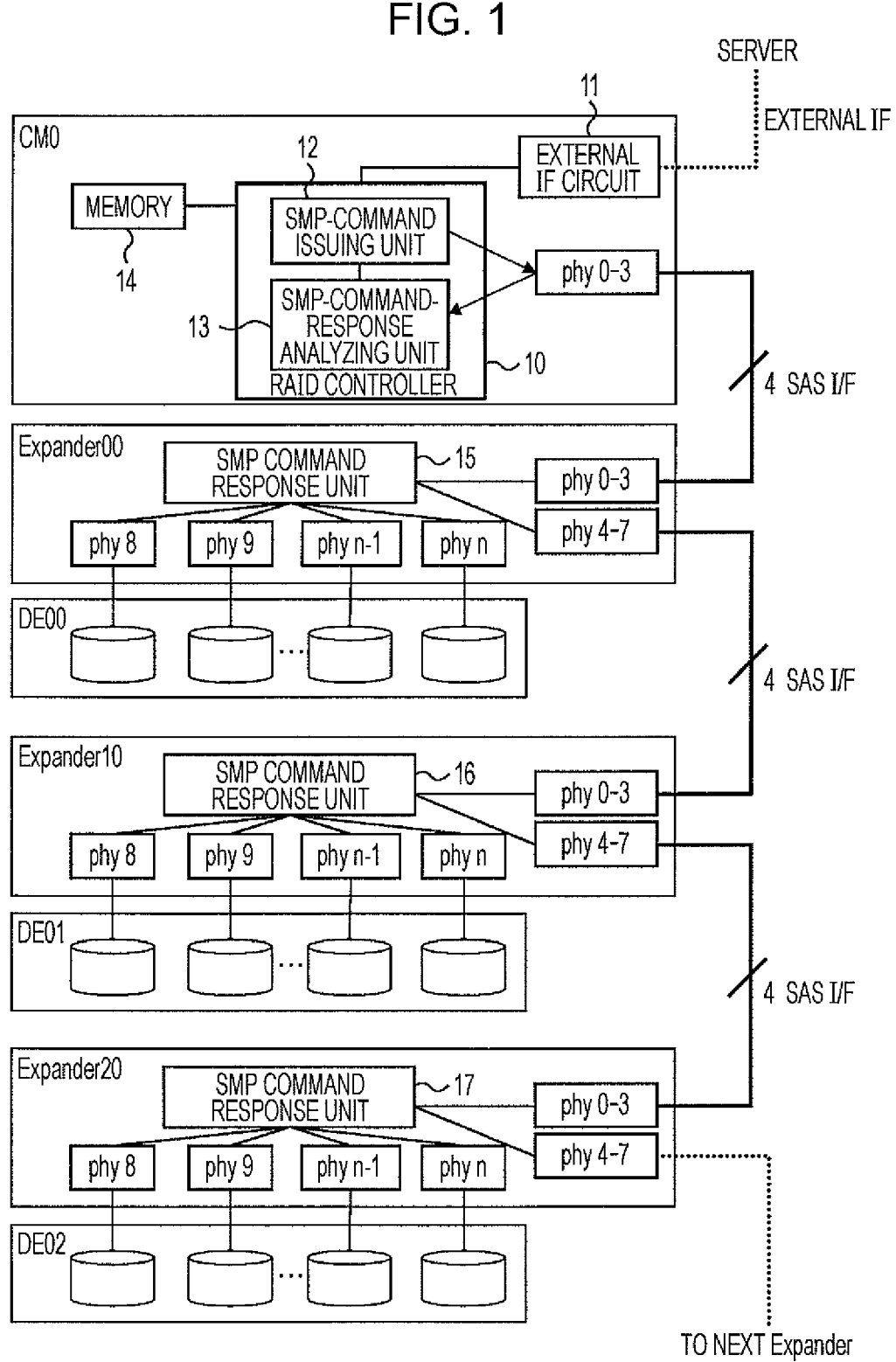
FIG. 1 is a block diagram of a disk system according to an embodiment.
Figure 3:
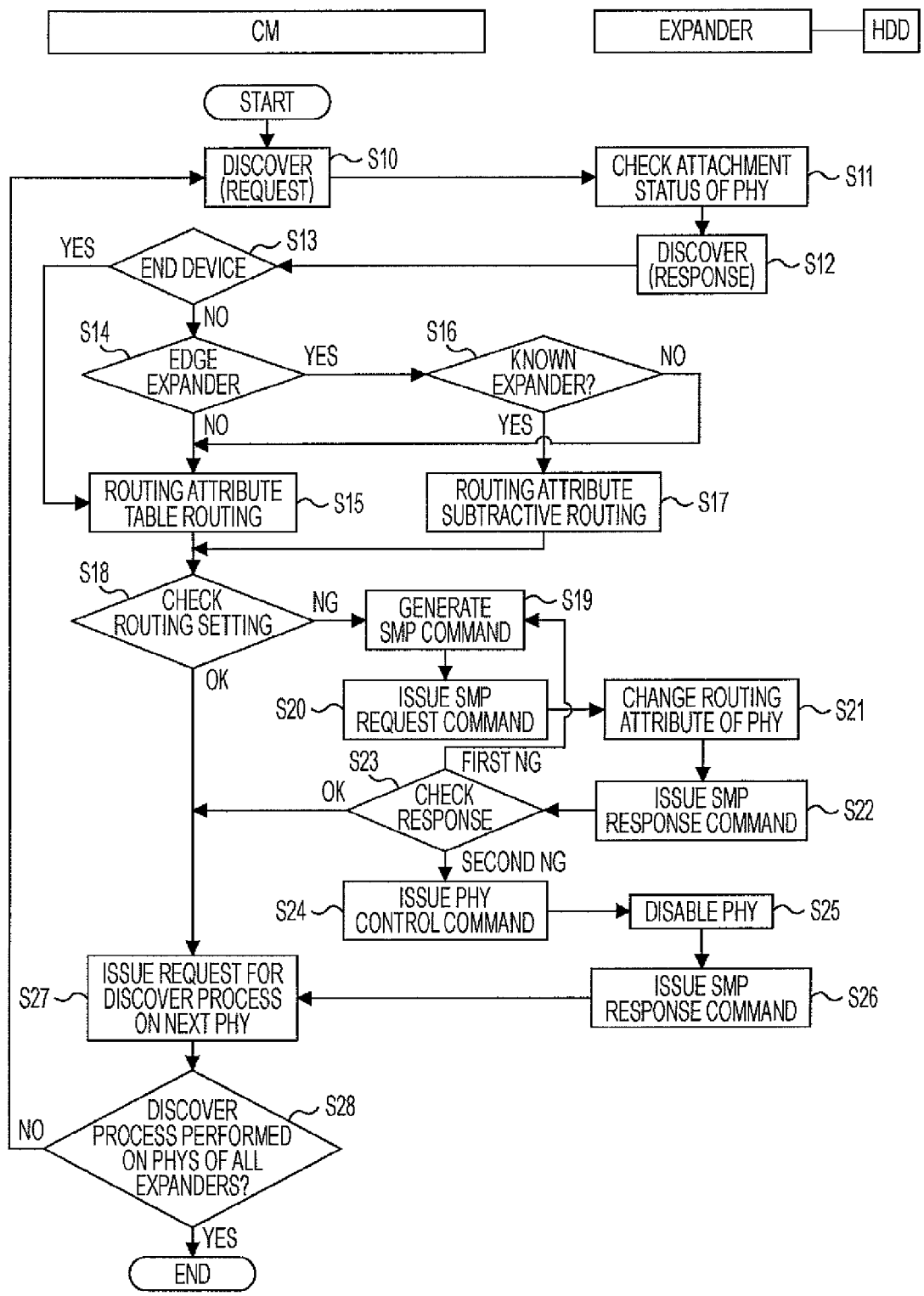
FIG. 3 is a flowchart of a process of checking and changing a routing method setting in the disk system according to an embodiment.
Figure 5:
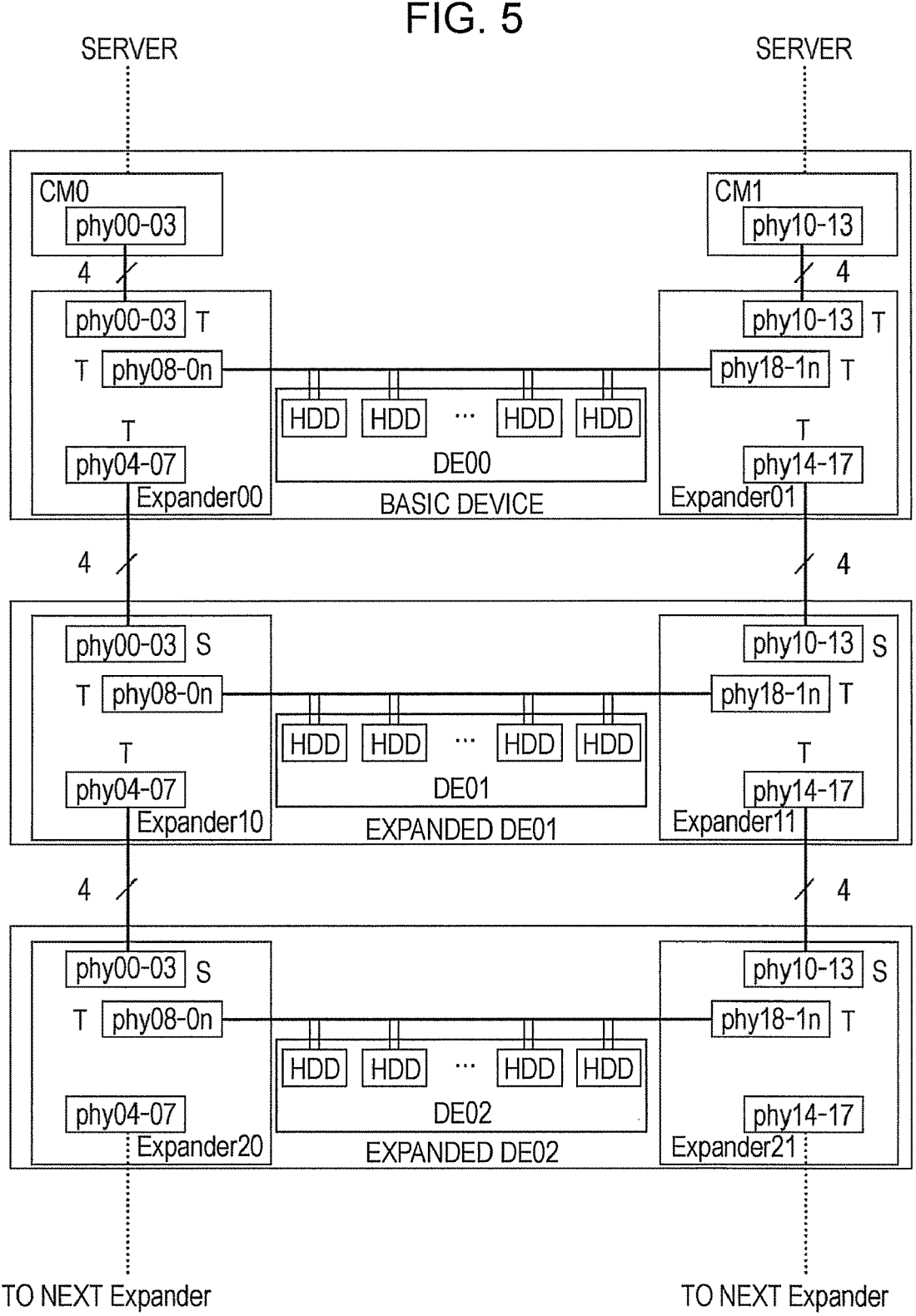
FIG. 5 is a block diagram of the related art.

FIG. 1 is a block diagram of a disk system according to an embodiment; FIG. 2 illustrates the format of a discover response frame, according to an embodiment; and FIG. 3 is a flowchart of a process of checking and changing the disk system routing method setting, according to an embodiment.

As shown in FIG. 1, a disk system including a controller CM0, disk enclosures DE00, DE01, and DE02, and expanders 00, 10, and 20 is attached to a server via an external interface circuit 11 of the controller CM0. The controller CM0 includes a RAID controller 10. The RAID controller 10 includes a serial management protocol (SMP)-command issuing unit 12 and an SMP-command-response analyzing unit 13. A memory 14 for storing information necessary for processing is attached to the RAID controller 10. The expander 00 includes an SMP command response unit 15. The expander 10 includes an SMP command response unit 16. The expander 20 includes an SMP command response unit 17. The SMP command response units 15, 16, and 17 are configured to send responses to SMP messages transmitted from the RAID controller 10.

When power is turned on, devices that are directly attached to each other (e.g., the controller CM0 and the expander 00, the expander 00 and disks in the disk enclosure DE00, and the expander 00 and the expander 01) perform initialization. By performing initialization, the controller CM0 recognizes the presence of an expander device, performs a discover process on the expander 00, and obtains information regarding a device(s) attached to the expander 00. A discover command issued here employs SMP, which is a protocol used by a controller to manage an expander device. A discover function is defined in the SAS-1.1 standard and is the function of collecting information regarding a device attached to a port. The RAID controller 10 in the controller CM0 issues discover commands for all phys 0 to n if the maximum number of expander phys is n. The SMP-command issuing unit 12 in the RAID controller 10 issues a discover request frame for an expander phy, and the corresponding expander checks the device attachment status of the phy and returns a discover response frame (FIG. 2).

FIG. 2 illustrates the format of the discover response frame, according to an embodiment.

In the discover response frame shown in FIG. 2, the FUNC-TION value is set to "10h". This setting value indicates that the frame shown in FIG. 2 is a discover response frame. The controller CM0 obtains information, such as the SAS address of a device attached to each phy, which is set and sent in the discover response frame, thereby obtaining information regarding all devices attached to the controller CM0. For detailed description of fields of the frame shown in FIG. 2, see "Serial Attached SCSI-1.1 (SAS-1.1) Revision 10, 10.4.3.5 discover function (pp. 452 to 459)" as needed.

The SMP-command-response analyzing unit 13 in the controller CM0 receives the discover response frame, which is shown in FIG. 2, and checks the ATTACHED DEVICE TYPE field (byte 12, bits 4 to 6). If the attached device is an end device (CM0 or HDD) or a new expander device (expander 10), it is checked whether the ROUTING ATTRIBUTE field (byte 44, bits 0 to 3) indicates table routing. By performing the discover process on the expander 00, the controller CM0 recognizes that the expander 10 is attached to the expander 00, and performs the discover process on the expander 10. In this case, the SMP-command-response analyzing unit 13 checks the ATTACHED DEVICE ATTRIBUTE field (byte 12, bits 4 to 6) and, if the attached device is an end device (HDD) or a new expander device (expander 20), it is checked whether the ROUTING ATTRIBUTE field (byte 44, bits 0 to 3) indicates table routing. If the attached device is a known expander device (expander 00), it is checked whether the ROUTING ATTRIBUTE field (byte 44, bits 0 to 3) field indicates subtractive routing. By performing the discover process on the expander 10, the controller CM0 recognizes that the expander 20 is attached to the expander 10, and performs the discover process on the expander 20. In this case, the controller CM0 reads information contained in a discover response frame sent from the SMP command response unit 17. If the ATTACHED DEVICE TYPE field (byte 12, bits 4 to 6) indicates an end device (HDD), it is checked whether the ROUTING ATTRIBUTE field (byte 44, bits 0 to 3) indicates table routing. If the ATTACHED DEVICE TYPE field (byte 12, bits 4 to 6) indicates a known expander device (expander 10), it is checked whether the ROUTING ATTRIBUTE field (byte 44, bits 0 to 3) is subtractive routing. Further, in the case where the next expanded DE is configured, as has been described above, if a device attached to an expander is an end device or a new expander detected by the discover process, it is checked whether the setting indicates table routing. If the attached device is a known expander device, it is checked whether the setting indicates subtractive routing.

In the case where the SMP-command-response analyzing unit 13 detects an error (in the case where the routing method is wrong), the discover sequence is temporarily stopped, and the SMP-command issuing unit 12 generates a command for changing the wrong routing method setting of the expander phy. To realize this changed routing method setting of the phy, for example, new functions are added to SMP. For example, using reserved fields in an SMP command frame, bits (eight bits) for the ID of the phy to be changed, bits (four bits) for changing the register setting of the ROUTING ATTRIBUTE field (0h for direct routing, 01b for table routing, and 02h for subtractive routing), and bits (eight bits) for counting the number of times the routing method has been changed are prepared. The SMP-command issuing unit 12 embeds information to be changed on the basis of the details of the error and issues an SMP command. Upon receipt of the command, the expander changes the setting of the phy and returns a response indicating successful termination or unsuccessful termination using an SMP response frame to the controller CM0. In the case of successful termination, the controller CM0 resumes the discover process on the next phy. In the case of unsuccessful termination, the controller CM0 reissues a command for changing the setting. If unsuccessful termination still occurs, the controller CM0 disables the phy using a SMP phy control command so that the phy becomes unusable, thereby separating that phy such that the entire system will not be affected.

FIG. 3 is a flowchart of checking and changing the routing method setting on the disk system according to an embodiment.

The left half of FIG. 3 shows processing performed by a controller CM, and the right half shows processing performed by an expander attached to an HDD. In S10, the controller CM requests the expander to perform a discover process on a phy. The expander checks the attachment status of the requested phy (S11) and returns a discover response frame to the controller CM (S12). In S13, the controller CM determines, from the discover response frame received, whether a device attached to the phy is an end device (disk or a device at a terminating end of a network to which the expander and the like are attached, namely, HDD). If the determination in S13 is yes, the flow proceeds to S15. If the determination in S13 is no, the controller CM determines in S14 whether the attached device is an edge expander (expander attached to the middle of the network). If the determination in S14 is no, it is determined in S15 that the routing attribute should be table routing, and the flow proceeds to S18. If the determination in S14 is yes, it is determined in S16 whether the attached device is a known expander. If the determination in S16 is no, the flow proceeds to S15. If the determination in S16 is yes, the flow proceeds to S17 in which it is determined that the routing attribute should be subtractive routing, and the flow proceeds to S18. Direct routing is used in the case where a controller and a disk are attached to each other in a one-to-one relationship and is not required for the setting of an expander.

In S18, the controller CM checks the routing setting in the discover response frame. If the determination in S18 is OK, the flow proceeds to S27. If the determination in S18 is not OK or no good, which is abbreviated as "NG", the flow proceeds to S19, and an SMP command is generated. In S20, an SMP request command changing the routing attribute of the phy is issued. In S21, the routing attribute of the phy is changed. In S22, as a result of the change, an SMP response command is issued. In S23, the response is checked. If the determination in S23 is NC for the first time, the flow returns to S19. If the determination in S23 is NG for the second time, the flow proceeds to S24. If the determination in S23 is OK, the flow proceeds to S27. In S24, a phy control command is issued. In S25, the phy is disabled so that the phy will not be used. In S26, an SMP response command is issued, and the flow proceeds to S27.

In S27, a request for performing a discover process on the next phy is issued, and the flow proceeds to S28. In S28, it is determined whether a discover process has been performed on phys of all expanders. If the determination in S28 is no, the flow returns to S10. If the determination in S28 is yes, the flow ends.

FIG. 4 illustrates the format of a phy control frame, according to an embodiment.

A method of disabling an expander phy will now be described. This is performed, for example, by inserting the description of an operation to be performed into byte 10 of the phy control frame format shown in FIG. 4. To disable a phy, byte 10 is set to "03h" (operation: disable). With this processing, the phy becomes unusable. The phy can be separated from the system without physically separating an HDD or an initiator.

The types of descriptions of operations that can be set in byte 10 of the phy control frame format shown in FIG. 4 are summarized in the following Table 1, a detailed description of which is given in the description of various frame formats in "Serial Attached SCSI-1.1 (SAS-1.1) Revision 10, 10.4.3 SMP functions (pp. 442 to 475)".

TABLE 1

| Code | Operation | Description |
| --- | --- | --- |
| 00h | NOP | No operation |
| 01h | LINK RESET | If the specified phy is not a virtual phy, perform a link reset sequence on the specified phy and enable the specified phy. If the specified phy is a virtual phy, perform an internal reset and enable the specified phy. The SMP response shall be returned without waiting for the link reset to complete. |
| 02h | HARD RESET | If the specified phy is not a virtual phy, perform a link reset sequence on the specified phy and enable the specified phy. If the attached phy is a SAS phy or an expander phy, the link reset sequence shall include a hard reset sequence. If the specified phy is a virtual phy, perform an internal reset and enable the specified phy. The SMP response shall be returned without waiting for the hard reset to complete. |
| 03h | DISABLE | Disable the specified phy. |
| 04h | Reserved | |
| 05h | CLEAR ERROR LOG | Clear the error log counters for the specified phy. |
| 06h | CLEAR AFFILIATION | Clear an affiliation from the STP initiator port with the same SAS address as the SMP initiator port that opened this SMP connection. |
| 07h | TRANSMIT SATA PORT SELECTION SIGNAL | This function shall only be supported by phys in an expander device. If the expander phy incorporates an STP/SATA bridge and supports SATA port selectors, the phy shall transmit the SATA port selection signal which causes the SATA port selector to select the attached phy as the active host phy and make its other host phy inactive. |
| All others | Reserved | |

By performing the foregoing processing, when power of a magnetic disk apparatus is turned on, the magnetic disk apparatus can start operating without making a user aware of the cable misconnections and the routing setting. The embodiments can be implemented in software and/or computing hardware. For example, the controller 10 (Control Module or CM) can be computing hardware (e.g., circuitry) and/or a programmed computer processor by executing instructions stored on a computer readable media (e.g., memory 14) for performing the embodiment operations.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A disk-drive automatic recognition/setting apparatus for a disk system including a controller, a disk drive, and an expander attached to the controller, the disk drive, or another expander, the apparatus comprising:
    an information requester issuing a request for obtaining information regarding a device attached to each attachment port of the expander; and
    a routing method reset request transmitter detecting based upon device type information in the information obtained, whether a type of a routing method of an attachment port of the expander is correctly set according to a type of device attached to the attachment port of the expander, and, if the type of the routing method is incorrectly set, transmitting to the expander a routing method reset request by a serial management protocol (SMP) command to correctly reset the incorrect type of the routing method of the attachment port to a correct routing method type for the type of device attached to the attachment port of the expander,
    wherein the transmitting of a frame of the SMP command for the resetting embeds routing method information to be changed based upon a detected routing method type error for a type of device attached to an attachment port of an expander, the embedded information including an identifier of a target attachment port for which a routing method type is to be changed and information for changing the routing method type of the target attachment port.

2. The disk-drive automatic recognition/setting apparatus according to claim 1, wherein the disk system is a redundant array of independent disks (RAID) system with a serial attached small computer system (SAS) 1.1 interface.

3. The disk-drive automatic recognition/setting apparatus according to claim 2, wherein the request for obtaining information is a discover process.

4. The disk-drive automatic recognition/setting apparatus according to claim 1, wherein a serial management protocol (SMP) command frame further includes embedded information for counting a number of times the routing method type has been changed.

5. The disk-drive automatic recognition/setting apparatus according to claim 1, wherein the routing method reset request transmitter disables the attachment port of which the routing method type cannot be reset in response to the reset request.

6. A disk-drive automatic recognition/setting method for a disk system including a controller, a disk drive, and an expander attached to the controller, the disk drive, or another expander, the method comprising:
    issuing a request for obtaining information regarding a device attached to each attachment port of the expander;
    obtaining the information requested;
    detecting, based upon device type information in the information obtained, whether a type of a routing method of an attachment port of the expander is correctly set according to a type of device attached to the attachment port of the expander; and
    transmitting to the expander, if the type of the routing method is determined to be incorrectly set, a routing method reset request by a serial management protocol (SMP) command for correctly resetting the incorrect type of the routing method of the attachment port to a correct routing method type for the type of device attached to the attachment port of the expander,
    wherein the transmitting of a frame of the SMP command for the resetting embeds routing method information to be changed based upon a detected routing method type error for a type of device attached to an attachment port of an expander, the embedded information including an identifier of a target attachment port for which a routing method type is to be changed and information for changing the routing method type of the target attachment port.

7. The disk-drive automatic recognition/setting method according to claim 6, wherein the disk system is a redundant array of independent disks (RAID) system with a serial attached small computer system (SAS) 1.1 interface.

8. The disk-drive automatic recognition/setting method according to claim 7, wherein the request for obtaining information is a discover process.

9. The disk-drive automatic recognition/setting method according to claim 6, wherein a serial management protocol (SMP) command frame further includes embedded information for counting a number of times the routing method type has been changed.

10. The disk-drive automatic recognition/setting method according to claim 6, further comprising disabling the attachment port of which the routing method type cannot be reset in response to the reset request.

11. The apparatus according to claim 1, wherein the routing method type of the attachment port of the expander is one or more of a direct routing, a table routing, or subtractive routing.

12. The method according to claim 6, wherein the routing method type of the attachment port of the expander is one or more of a direct routing, a table routing, or subtractive routing.

13. A disk system including disk drives and one or more expanders attaching the disk drives, the disk system comprising:
    a controller that executes:
        discovering information regarding a device attached to each attachment port of each expander,
        detecting, according to the discovering of the device information, an error in a type of a routing method of an attachment port of an expander, based upon a type of device attached to the attachment port of the expander, and
        according to the error detecting, resetting the type of the routing method of the attachment port of the expander by transmitting to the expander a routing method reset command by a serial management protocol (SMP) command to correctly set the type of the routing method of the attachment port to a correct routing method type for the type of device attached to the attachment port of the expander,
    wherein the resetting by a frame of the SMP command embeds routing method information to be changed based upon a detected routing method type error for a type of device attached to an attachment port of an expander, the embedded information including an identifier of a target attachment port for which a routing method type is to be changed and information for changing the routing method type of the target attachment port.

14. The disk system according to claim 13, wherein a serial management protocol (SMP) command frame further includes embedded information for counting a number of times the routing method type has been changed.

15. The disk system according to claim 14, wherein the routing method type of the attachment port of the expander is one or more of a direct routing, a table routing, or subtractive routing.

16. A disk-drive automatic recognition/setting apparatus for a disk system including a controller, a disk drive, and an expander attached to the controller, the disk drive, or another expander, the apparatus comprising:
    an information requester that issues a request for obtaining information regarding a device attached to each attachment port of the expander; and
    a routing method reset request transmitter that detects based upon device type information in the information obtained, whether a type of a routing method of an attachment port of the expander is correctly set according to a type of device attached to the attachment port of the expander, and, if the type of the routing method is incorrectly set, transmits to the expander a routing method reset request to correctly reset the incorrect type of the routing method of the attachment port to a correct routing method type for the type of device attached to the attachment port of the expander,
    wherein the transmitting of the routing method reset request embeds routing, method information to be changed based upon a detected routing method type error for a type of device attached to an attachment port of an expander, the embedded information including an identifier of a target attachment port for which a routing method type is to be changed and information for changing the routing method type of the target attachment port, and the routing method reset request transmitter disables the target attachment port of the expander when a number of a no-good (NG) response, which indicates resetting of the incorrect type of the routing method has failed, exceeds a predetermined number of times.

\* \* \* \* \*

UNITED STATES PATENT AND TRADEMARK OFFICE
CERTIFICATE OF CORRECTION

| | | |
|---|---|---|
| PATENT NO. | : 7,912,992 B2 | Page 1 of 1 |
| APPLICATION NO. | : 11/955816 | |
| DATED | : March 22, 2011 | |
| INVENTOR(S) | : Tomonori Suzuki | |

It is certified that error appears in the above-identified patent and that said Letters Patent is hereby corrected as shown below:

Column 8, Line 64 in Claim 16, delete "routing," and insert -- routing --, therefor.

Signed and Sealed this
Thirty-first Day of May, 2011

David J. Kappos
*Director of the United States Patent and Trademark Office*